March 20, 1956 R. H. MACY ET AL 2,738,749
CARGO VESSEL FOR TRANSPORTING HEATED CARGO AND GENERAL CARGO
Filed Jan. 17, 1955 3 Sheets-Sheet 1
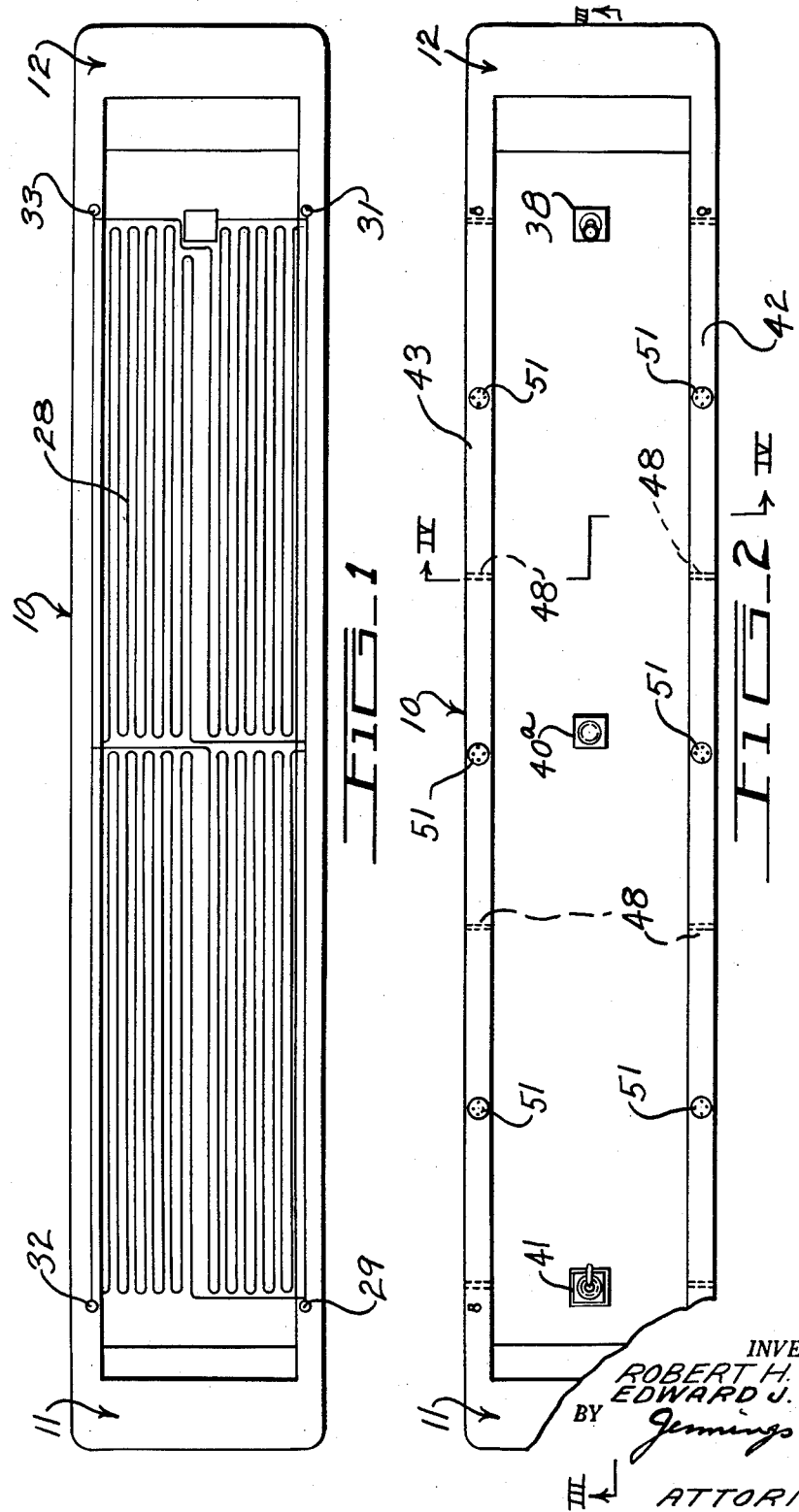
INVENTOR.
ROBERT H. MACY
EDWARD J. BUCK
BY Jennings & Carter
ATTORNEYS

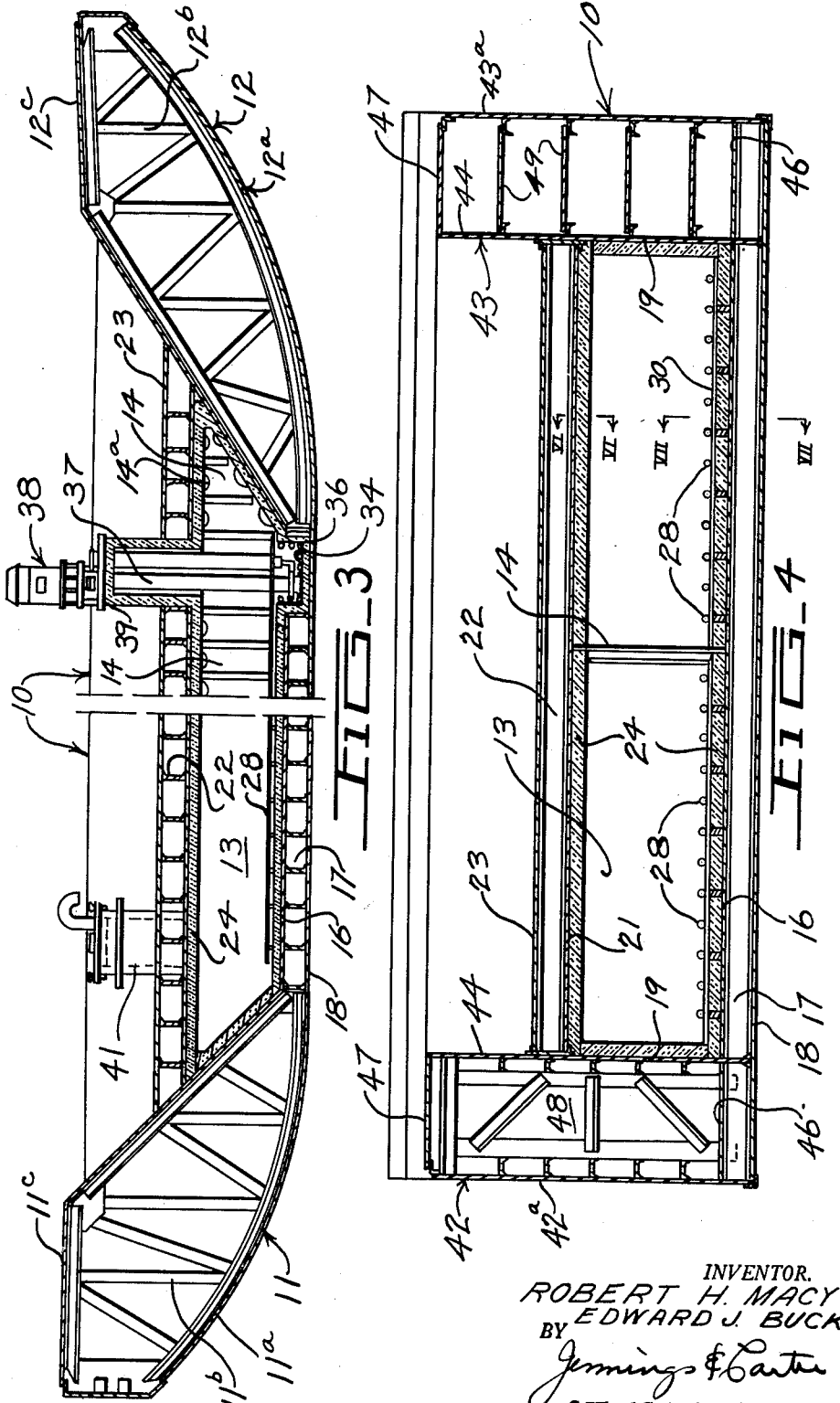

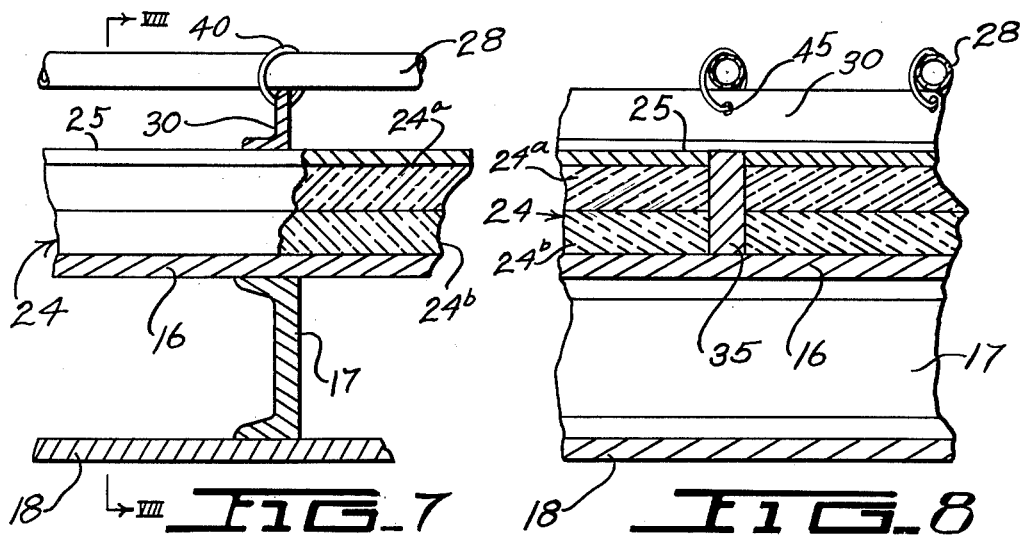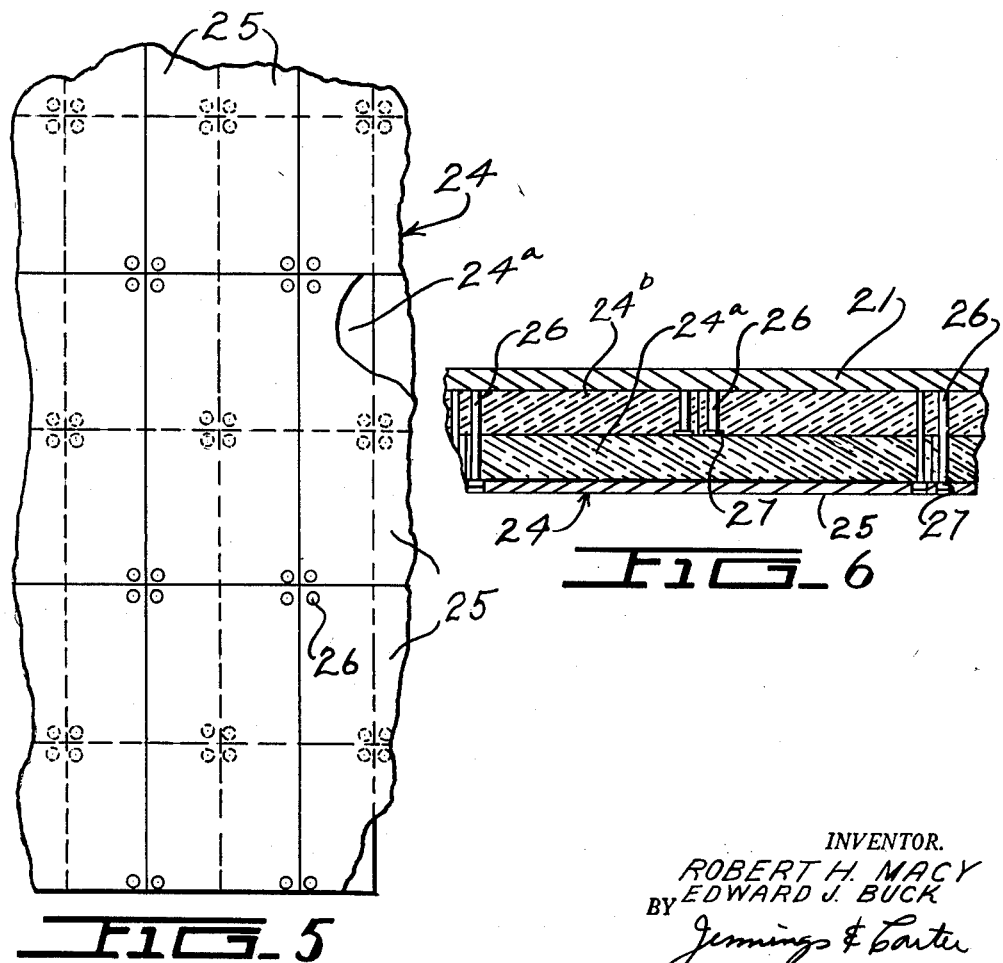

United States Patent Office 2,738,749
Patented Mar. 20, 1956

2,738,749

CARGO VESSEL FOR TRANSPORTING HEATED CARGO AND GENERAL CARGO

Robert H. Macy, Pascagoula, Miss., and Edward J. Buck, New Orleans, La., assignors to The Ingalls Shipbuilding Corporation and Coyle Lines Incorporated, both corporations of Delaware Application January 17, 1955, Serial No. 481,995

3 Claims. (Cl. 114—73)

This invention relates to cargo vessels, and while not limited thereto relates specifically to barges especially adapted to transport molten sulphur and the like in one compartment or compartments, unheated liquid cargo in other compartments, and dry cargo as a deck load.

In the mining of sulphur it is customary to raise the temperature thereof in situ above the melting point, in the neighborhood of 250° F. to 300° F. by pumping hot water under pressure into the bed of sulphur. In many instances deposits of such sulphur are located close to large bodies of water. In this case it is possible and desirable to ship sulphur from the point where it is brought to the surface in molten form to a place where it will be processed or stored. As is known, molten sulphur may be pumped and otherwise handled as a liquid so that it may be pumped into and out of transporting vessels, thus facilitating the loading and unloading of the vessel.

One objection to transporting such molten cargo by barge heretofore has been the fact that the storage tanks on such vessels had to be constructed separately from the barge structure proper and had to be insulated on the outside. Such construction necessitated the use of a shell or the like over the insulation to protect the same and was expensive and bulky. A second difficulty heretofore has been that vessels constructed for molten cargo transport were suitable only for transporting molten cargo. Due to the arrangement of the outside insulated tank or tanks it heretofore has been impractical to provide any appreciable amount of deck cargo space in such vessels. Hence, on return trips the vessel returned with no pay cargo, or a very small amount thereof.

In view of the foregoing it is the prime object of our invention to provide a barge having storage space for molten cargo, storage space for non-heated liquid cargo, and deck space for dry cargo such as automobiles and the like.

Another object is to provide a barge having a central storage tank section especially adapted for the transportation and discharge of molten sulphur, an open cargo carrying deck section over the tank section, and wing tanks for non-heated liquid cargo along each side of the central section and extending above the level of the deck section, whereby there is provided a barge capable of carrying substantial tonnages of molten sulphur, or, non-heated liquid cargo and dry cargo.

A more specific object is to provide a barge having a molten cargo tank section in which the tank is lined on its inner surfaces with heat insulation material of a type and thickness thermally to insulate the molten cargo during transit, together with heating coils suitably supported in the bottom of the tank to supply additional heat to the cargo if needed to liquify the same for discharge by pumping.

A further more specific object is to provide a molten cargo tank in which the inner surfaces thereof are lined with bats or sheets of fibrous glass insulating material of suitable thickness, thus providing a tank lined with material wholly inert to molten sulphur.

Another object is to provide an insulated tank of the character designated in which heating coils are supported therein in spaced relation to the inner surface of the lining, preferably spaced from the lining in the bottom of the tank, whereby the material being heated may circulate around the coils, resulting in more efficient heat transfer to the material.

A still further object is to provide a barge or similar vessel in which there is a molten cargo tank which occupies substantially all of the mid-ships cargo carrying portion of the barge, there being a weather deck above the molten cargo tank or the like, together with wing tanks on each side of the main molten cargo section and which extend above the level of the weather deck, whereby on one trip the barge may carry a full cargo of molten sulphur or the like in the main section, and on the return trip the barge may carry a combination of dry deck cargo and liquid cargo in the wing tanks such for instance as automobiles and oil.

A barge illustrating the features of our invention is shown in the accompanying drawings forming a part of this application, in which:

Fig. 1 is a wholly diagrammatic plan view of a barge and showing the arrangement of the heating coils in the molten cargo section thereof;

Fig. 2 is a somewhat diagrammatic plan view, partly broken away;

Fig. 3 is a detail, fragmental longitudinal sectional view taken generally along line III—III of Fig. 2;

Fig. 4 is a transverse sectional view taken generally along line IV—IV of Fig. 2;

Fig. 5 is a fragmental detail view showing a method of applying the bats or sheets of insulating material to the inner surfaces of the molten cargo tanks;

Fig. 6 is an enlarged detail sectional view taken generally along line VI—VI of Fig. 4;

Fig. 7 is an enlarged detail sectional view taken generally along line VII—VII of Fig. 4; and, Fig. 8 is a detail sectional view taken generally along line VIII—VIII of Fig. 7.

Referring now to the drawings for a better understanding of our invention we show a barge indicated generally by the numeral 10 and which may embody rake ends 11 and 12. The rake ends consist of the usual bottom plating 11a and 12a, the usual internal structural members 11b and 12b, and the usual deck plates 11c and 12c.

In the central or midship section of the barge we place our improved molten sulphur tank 13. The tank 13 may be divided by a baffle 14 and the baffle 14 may be provided with openings 14a.

The tank 13 may have bottom plating 16 which rests on transverse beams 17. On the underside of the beams is secured the bottom plating 18 for the vessel. In like manner, the tank may have end plates 19 and a top plate 21, the latter being secured underneath deck beams 22. At 23 we show weather deck plating secured in the usual manner to the beams 22.

The entire inner surfaces of the tank 13 are covered with insulation material, preferably a plurality of separate layers as will appear, indicated generally throughout the drawings by the numeral 24. Preferably, the insulation 24 comprises two layers 24a and 24b. The material for the layers may be sheets of glass fiber material or glass of cellular construction. One such suitable product is sold commercially under the trade name of "Foamglas." On the inside of the layers of insulation we provide a layer of hard asbestos board 25 which may be on the order of 3/16 inch thick. The purpose of this layer 25 is to aid in holding the layers 24a and 24b in place and also to provide a surface which resists abrasion and which will support workers doing work in the tank 13. We preferably apply the sheets of insulation 24a and 24b and the inner layer 25 to the inner surfaces of the tank by means of studs 26. As is known, the studs may be end welded to the plates 16, 19 or 21, as the case may be whereby the heads thereof indicated at 27 support the sheets or layers 24a and 24b and the layer of hard asbestos board. We prefer to employ studs 26 of such length that only approximately 20% thereof pass through all layers 24a, 24b and 25 of the insulation 24, the remainder passing only through the layers 24b and secured to 21. Further, we prefer to apply a suitable cement between the layers 24a and 24b and prefer to stagger joints of the layers as indicated in Fig. 5 thus to provide a tank which is completely insulated. We have found that each layer 24a and 24b should be approximately 2 inches thick, giving a total insulation of approximately 4 inches.

In the bottom of the tank 13 we place steam coils 28. The coils 28 are laid out diagrammatically as indicated in Fig. 1. Steam may be supplied to connections 29 and 31 and condensate may be removed from the lines through connections 32 and 33. It will be understood that the supply of steam is on the dock to which the vessel goes to be unloaded.

As best shown in Figs. 7 and 8, the steam coils 28 preferably are supported on angles 30. The angles in turn are supported on vertically disposed plates 35 which are spaced at intervals along the bottom 16 of the tank. The steam coils 28 may be secured to the angles 30 by wires 40 or the like which pass through holes 45 formed in the angles 30. Adjacent one end of the barge we may provide a sump 34 as shown in Fig. 3. The sump may be provided with steam heating coils 36, supplied with steam from any suitable source. Projecting into the sump is the intake end of a pumping unit 37. The pumping unit 37 may be operated by the usual motor or the like 38 mounted on a pump support 39.

Adjacent the other end of the barge the tank 13 may be vented through an expansion trunk 41. A filling opening provided with a closure 40a may be located adjacent the center of the barge. Suitable connections, not shown, are provided from the pump to a source of discharge.

Along the sides of the barge we provide wing tanks 42 and 43. These tanks may be provided with the usual side plates 42a and 43a, bottom plates 46 and top plates 47. Further, the tanks may be provided with bulkheads 48 at intervals and there may be cross braces in the form of plates where desired as indicated at 49. It will be noted that the wing tanks 42 and 43 extend substantially from the tops of the bottom cross beams 17 to a point considerably above the level of the weather deck 23. In this manner we provide a deck space on top of the plate 23 and between the inboard plates 44 of the tanks 42 and 43 for hauling dry cargo. The tanks 42 and 43 may be used to haul non-heated liquid cargo such as oil. The tanks 42 and 43 may be provided with manholes having covers 51 through which openings the tanks may be filled and discharged.

From the foregoing the method of constructing and using our improved barge may now be explained and readily understood. It will be seen that the plating for the molten sulphur tank 13 forms an integral part of the barge construction described herein. Thus, the tank 13 is not a separate unit, merely supported on a barge as heretofore proposed. Due to the fact that we insulate the inside of the tank 13 we are thus enabled to embody the tank 13 integrally in the construction of the barge and to employ all of the plating for the tank as structural parts of the barge itself. Therefore, our improved barge may be employed to haul a full cargo of sulphur in molten state on one leg of a journey. If the sulphur is hot enough when pumped into the barge the insulation may well maintain the same molten for a sufficient length of time to permit the same to be pumped out of the barge without the addition of extra heat. If, however, extra heat is necessary steam may be admitted to the coils 28 through the connections 29 and 31 and the condensate removed from the connections 32 and 33. When the sulphur is molten enough to be discharged, pump 38 may be started, thus discharging the barge.

With the barge discharged of its molten cargo the wing tanks 42 and 43 may be filled with liquid cargo such as oil, gasoline or the like and the deck may be filled with dry cargo, such for instance as automobiles or general cargo. Therefore, on the return trip the barge carries substantial tonnages of dry cargo on its deck and substantial tonnages of non-heated liquid cargo in its wing tanks. Our improved barge thus is capable of extremely economical use for hauling non-heated liquid cargos and dry cargos while yet being specifically designed to haul also molten sulphur or similar heated cargos.

From the foregoing it will be apparent that we have devised an improved barge especially adapted for hauling molten or heated cargos. By insulating the tank on its entire inner surfaces, as stated, we greatly simplify the construction of the tank itself and also are enabled to integrate the tank construction into the barge construction. Consequently, our improved barge is considerably lighter and stronger than a barge which has a specially adapted, outside insulated tank mounted in it for the transportation of molten sulphur. Also, by insulating the tank on the inside so that the hot sulphur does not contact the steel tank, we greatly reduce the expansion of the tank which occurs in prior, outside insulated tanks. We thereby eliminate also all sliding joints in our improved tank and all expansion joints in piping connections thereto, both of which have been required in prior constructions.

It will be understood that the expression "molten sulphur" and the word "molten" used in this specification and in the claims are intended to include sulphur and like which in fact is liquified by raising the temperature thereof. These terms also are intended to include other liquids which are to be transported while hot.

While we have shown our invention in but one form, it will be obvious to those skilled in the art that it is not so limited, but is susceptible of various changes and modifications without departing from the spirit thereof, and we desire, therefore, that only such limitations shall be placed thereupon as are specifically set forth in the appended claims.

What we claim is:

1. In a cargo vessel, a substantially closed tank, two separate superimposed layers of heat insulating glass material covering substantially the entire inner surfaces of the tank, and a layer of abrasion resisting material on the inner surfaces of the heat insulating material.

2. In a cargo vessel, a midships section embodying a thermally insulated tank for transporting heated cargo, a weather deck over the tank providing space for dry cargo, and wing tanks for liquid cargo extending alongside the midships tank section, said wing tanks extending above the level of the deck.

3. In a cargo vessel, a midships section embodying a tank for transporting heated cargo, a layer of heat insulating material covering substantially all of the inner surfaces of said tank, a weather deck over the tank providing space for dry cargo, and wing tanks substantially the length of the insulated tank and extending fore and aft on either side thereof, said wing tanks being deeper than the insulated tank and projecting above the level of the deck.

(References on following page)

References Cited in the file of this patent

UNITED STATES PATENTS

| | | |
|---|---|---|
| 1,111,740 | Frear | Sept. 29, 1914 |
| 1,562,991 | Rudigier | Nov. 24, 1925 |
| 2,120,286 | MacDonald | June 14, 1938 |
| 2,393,947 | Ximenez | Jan. 29, 1946 |
| 2,594,930 | Hudson | Apr. 29, 1952 |

FOREIGN PATENTS

| | | |
|---|---|---|
| 337,332 | Great Britain | Oct. 30, 1930 |

OTHER REFERENCES

Motor Ship, November 1952, vol. 37, No. 11, pages 28 and 29.

Oil and Gas Journal, March 22, 1954, pages 104, 105.

Scientific American, December 1942, page 274.